Sept. 3, 1940.   A. R. BIEDESS   2,213,684
MUCKING MACHINE
Filed Aug. 4, 1938   3 Sheets-Sheet 1

Inventor
Anthony R. Biedess
Clarence F. Poole
Attorney

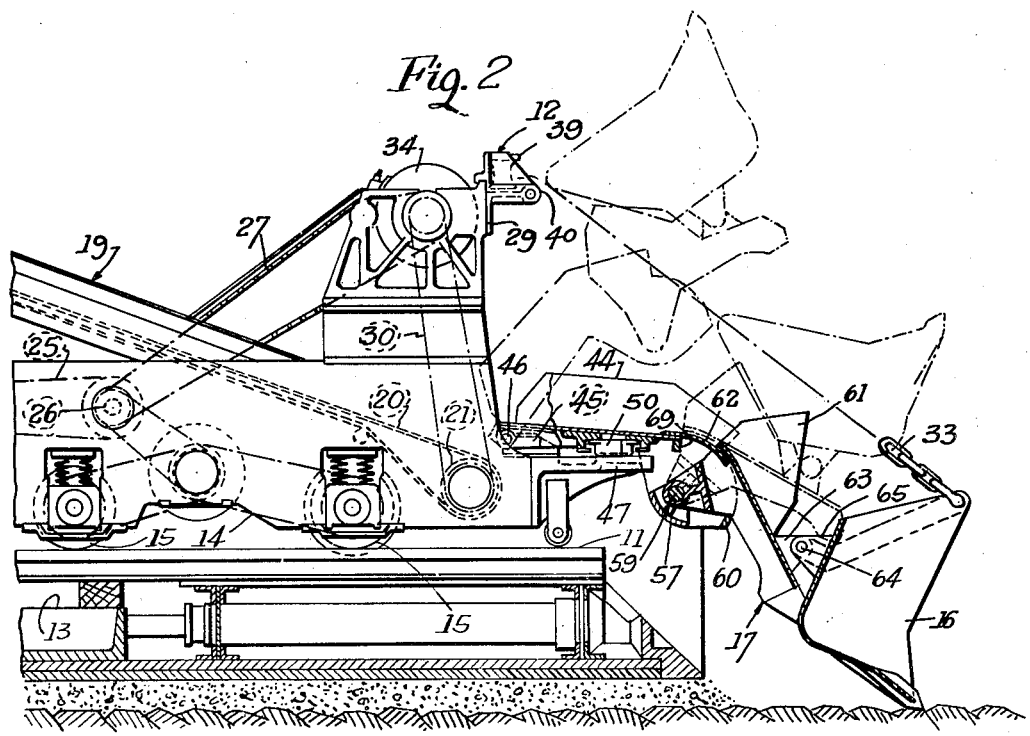
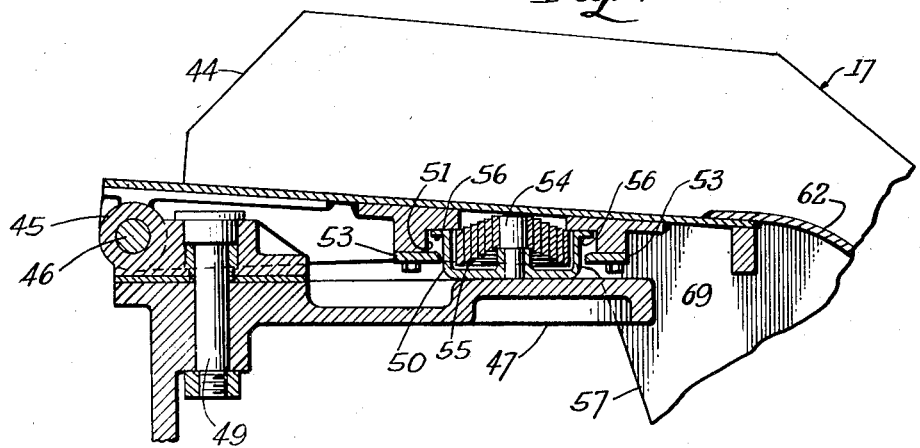

Sept. 3, 1940.  A. R. BIEDESS  2,213,684
MUCKING MACHINE
Filed Aug. 4, 1938  3 Sheets-Sheet 3
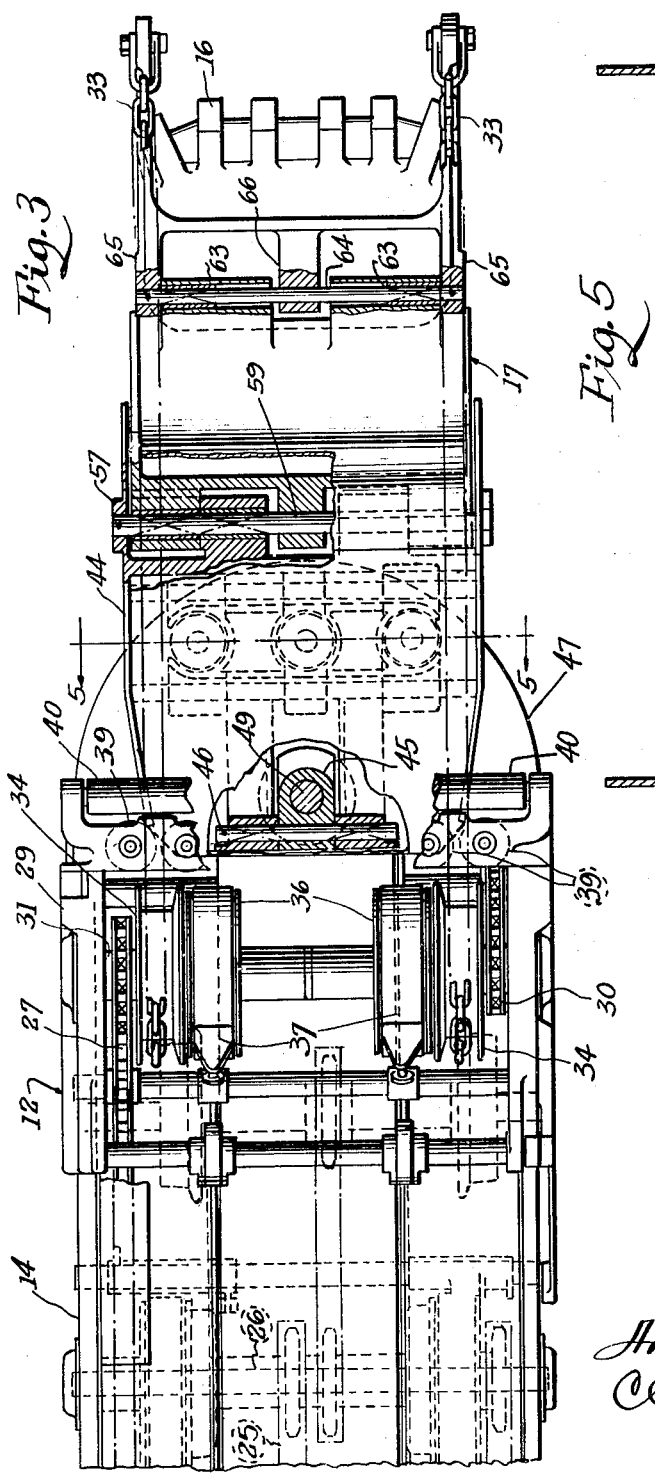
Inventor
Anthony R. Biedess
Clarence T. Poole
Attorney Patented Sept. 3, 1940

2,213,684

UNITED STATES PATENT OFFICE 2,213,684

MUCKING MACHINE

Anthony R. Biedess, Chicago, Ill., assignor to Goodman Manufacturing Company, Chicago, Ill., a corporation of Illinois Application August 4, 1938, Serial No. 223,082

13 Claims. (Cl. 214—90)

This invention relates to improvements in mucking machines and more particularly relates to improvements in mucking machines of the type illustrated in Patent No. 1,514,008 which issued to J. P. Mosier on November 4, 1924.

Mucking machines of the type aforementioned have heretofore been used in power mucking shields for shoveling muck or rock in tunnels, but difficulty has been encountered in getting the mucking scoop low enough to gather material from the ground and still arrange the machine so that the feeding, elevating and discharge functions of the scoop may operate in an efficient manner, without increasing the size of the machine to an undesirable extent. The reasons are that the track in the shield must be laid on the tunnel liners and, accordingly, is several feet above the ground, and when the scoop of the standard type of mucking machine is lowered to its normal gathering position, it doesn't reach the ground. An attempt to remedy this has been made by providing a goose neck boom for supporting the scoop, or by lengthening the boom and inclining the support and stop for the boom, which projects from the forward end of the frame, in a downward direction to permit the boom to reach downwardly a greater distance than formerly and position the scoop along the ground. The difficulties with such arrangements are that the angle of the cables, which manipulate the scoop and boom, with respect to the transverse pivotal axis of the boom is such that when the scoop and boom are lifted, the reaction is taken against the transverse pivotal axis of the boom, and the tendency is for the scoop and boom to be lifted upwardly together. This results in spillage of material from the scoop, and difficulty in swinging the boom from side to side, with a resultant decreased loading speed of the machine. The chief reasons for this are that in order for the machine to operate in a most efficient manner, the sequence of movement of the scoop and boom should be such that the scoop should first be pivoted upwardly to a relatively horizontal position so it may efficiently pick up the material from the ground and leave a clean bottom. The scoop and boom should then be simultaneously lifted together to a discharge position.

The principal object of my invention is to remedy this difficulty by arranging the mucking machine so the scoop will efficiently gather and load material from the ground below the level of the track on which the machine rests, by providing an articulated boom for supporting the scoop, which is of a novel and simplified construction, and which is so arranged that the angle of the cables manipulating the scoop and boom, with respect to the rear pivotal axis of the boom, is relatively wide when the scoop is in a gathering position, so said cables may first pivot the scoop in an upward direction to a substantially horizontal position, and then raise the scoop and boom for discharge onto the conveyer of the shovel.

Another object of my invention is to provide a new and improved form of articulated boom so arranged that movement of the entire machine along the rails in a forward direction will positively feed the scoop into the material it is desired to load.

Still another object of my invention is to provide a novel form of boom incorporating shock absorbing means therein, for absorbing the shocks as the boom and scoop are lowered to a gathering position.

Other objects of my invention will appear from time to time as the accompanying specification proceeds.

My invention may be more clearly understood with reference to the accompanying drawings wherein:

Figure 2 is an enlarged side elevation of the front part of the mucking machine with parts shown in longitudinal section;

Figure 3 is an enlarged plan view of the front part of the machine with certain parts broken away and certain other parts in horizontal section;

Figure 4 is an enlarged detail longitudinal sectional view of the rear part of the shovel supporting boom; and Figure 5 is an enlarged sectional view taken substantially along line 5—5 of Figure 3.

Figure 1:
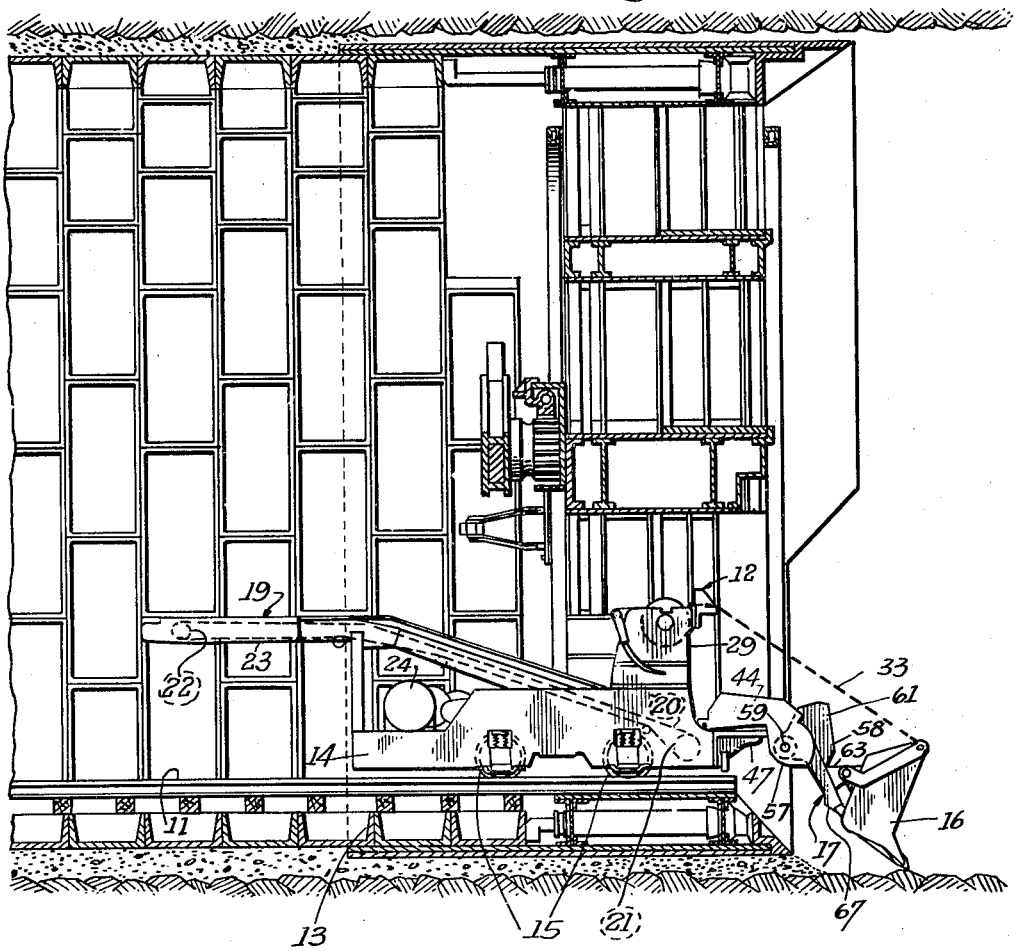
Figure 1 is a longitudinal sectional view of a tunnel and power mucking shield, showing a mucking machine constructed in accordance with my invention positioned in the shield for gathering material from the ground.

In the embodiment of my invention illustrated in the drawings, the machine is shown in Figure 1 as being positioned in a power mucking shield 10 of an ordinary type commonly used in tunnel operations, a form of which is clearly shown and described in a Patent No. 2,111,405 which issued to L. F. Parker on March 15, 1938. This power mucking shield is no portion of my present invention so will not herein be described in detail and includes a track 11, for the mucking machine 12, laid therein on top of tunnel liner plates 13, 13.

The mucking machine 12 includes a truck or main frame 14 mounted on track wheels 15, 15. Said main frame forms a support for a scoop 16 which is supported in advance thereof on the end of a boom 17.

The main frame 14 is provided with a conveyer 19 extending from a point disposed adjacent the lower forward end thereof in a rearwardly and upwardly inclined direction, which flattens out to a horizontal discharge position beyond the rear end of said main frame. Said conveyer is herein shown as being a belt conveyer of an ordinary construction and includes a belt 20 trained around a drive roller 21 at the forward end of the main frame 14 and around an idler roller 22 at the rear end of a horizontal projecting portion 23 of the conveyer frame.

The conveyer 19 is driven from a motor 24, shown generally in outline in Figure 1, which may be of a usual electric type. The drive from said motor to said conveyer includes a chain and sprocket drive generally indicated by reference character 25 which drives a transverse shaft 26. A chain and sprocket drive generally indicated by reference character 27 is driven from said shaft and extends in an upwardly inclined direction from said shaft to a transverse shaft 31 on a head frame 29, disposed above the forward end of the truck 14. A chain and sprocket drive generally indicated by reference character 30 is driven from said last mentioned transverse shaft and extends downwardly therefrom and has driving connection with the drive roller 21.

The motor 24 also serves to drive the other moving parts of the machine, and drives the track wheels 15, 15 from the transverse shaft 26 in either a forward or reverse direction without reversal of the motor, in a manner similar to that shown in the aforementioned Mosier Patent No. 1,514,008 and not herein shown or described in detail since it is no portion of my present invention.

The scoop 16 is elevated to a discharge position or swung from side to side by a pair of flexible cables or chains 33, 33 connected to opposite sides of the corners thereof, which are its upper corners when said scoop is in a gathering position. Said chains are adapted to be wound on or paid off of a pair of winding drums 34, 34 mounted on the transversely extending shaft 31. Planetary geared reduction devices 36, 36, controlled by suitable friction bands 37, 37, are also mounted on said transverse shaft and form a means for independently driving either of said winding drums from said shaft. Said planetaries are of a construction similar to that disclosed in the aforementioned Mosier patent and form no part of my present invention so will not herein be shown or described in detail.

Each flexible chain 33 is trained from a winding drum 34 through a pair of vertically arranged guide rollers 39, 39 and over a horizontal guide roller 40 and downwardly to the scoop 16 to which it is connected. When both of the planetaries 36, 36 have driving connection with the winding drums 34, 34, the boom 17 and scoop 16 will be pivoted in an upward direction to the discharge position shown by broken lines in Figure 2. When it is desired to swing the scoop to one side or the other of the track, power is applied to the winding drum on the side it is desired to swing, and is relieved from the other winding drum in a usual manner, which need not herein be shown or described since it is no portion of my present invention.

Referring now in particular to the novel form and construction of the boom 17, said boom includes a rear section 44 which is of a trough like construction, and which is pivotally mounted at its rear end on a hinged member 45 by means of a transverse hinge pin 46. Said hinged member is in turn pivotally mounted on a horizontal portion 47 of the truck frame 14, above but adjacent the forward end of the conveyer 19, on a vertical pin 49.

The horizontal portion 47 of the truck frame 14 extends forwardly beyond the conveyer a substantial distance, in a relatively horizontal direction, and forms a support for the rear section 44 of the boom 17, and limits downward pivotal movement thereof. Said horizontal portion is adapted to be engaged by the underside of a plurality of shock absorbing members, herein shown as including cup shaped buttons 50, 50, which are mounted in shouldered recesses 51, 51 in the underside of the forward end of the rear section 44 of the boom 17, for yieldable movement with respect thereto (see Figure 4). Said buttons are retained in said shouldered recesses by retaining members 53, 53 secured to the underside of said boom, and adapted to engage ears 56, 56 projecting in opposite directions from said buttons (see Figure 4). Each button 50 has an inwardly projecting pin 54 mounted therein, which pin in turn has a spiral spring 55 secured thereto, and so arranged that the outer spiral of said spring engages the shouldered portion 51. Thus, said spiral springs tend to force the buttons 50 in an outward direction with respect to said boom, and when said boom engages the forwardly projecting portion 47 of said truck frame, said buttons will yield, and form a yieldable shock absorbing means for said boom, to relieve the shocks encountered when the scoop 16 is dropped to a gathering position.

The rear section 44 of the boom 17 is provided with a depending forward end 57, to which is pivotally mounted a forward section 58 of said boom, on a shaft 59. Said shaft is disposed beneath the horizontal projecting portion 47 of the truck frame 14. Said depending forward end is provided with a stop 60 extending thereacross and adapted to engage the underside of the forward section 58 of the boom, to limit pivotal movement thereof in a downward direction, and to form an abutment against which the boom may react when the machine is moved in a forward direction, so forward movement of the machine will force the scoop and boom into the material it is desired to load.

The forward section 58 of the boom 17 is provided with outwardly flared sides 61, 61 and a rear end which is slightly curved to conform to a forwardly projecting curved portion 62 of the rear section 44 of said boom.

The scoop 16 is pivotally connected to the forward section 58, adjacent the forward end thereof, on a pair of upwardly projecting bracket members 63, 63 which form a bearing support for a shaft 64. Said shaft extends through bracket members 65, 65 and 66, projecting rearwardly from the side of the scoop 16, which is its rear side when in a gathering position. A forward end 67 of said forward section projects beyond the bracket members 63, 63 and is adapted to engage the scoop to limit downward pivotal movement thereof, and form an abutment against which the scoop reacts when it is being fed into the material it is desired to gather, by movement of the truck 14 along the track.

It should be understood that the position of the stop 60 may be changed for varying conditions to position the scoop 16 the desired distance below the rails, and, if desired, an adjustable stop may be provided, such as a pin engageable with any of a plurality of apertures. It will be seen from the foregoing that when the scoop is in a lowermost gathering position, the angle of the chains 33 with respect to a line drawn through the axis of the hinge pin 46 and the centers of the rollers 40, 40, is relatively wide so that pull on the chains 33, 33 will first pivot the scoop in an upward direction about the axis of the shaft 64 and then pivot the forward portion of the boom 17 about the axis of the shaft 59 until said forward portion engages a stop 69 disposed adjacent the forward end of the rear portion 44 of said boom (see Figures 2 and 4). At this point the scoop will be in a relatively horizontal position loaded with material, and engagement of said rear portion of said boom with said stop will cause the entire boom to be pivoted in an upward direction about the axis of the hinge pin 46.

It may thus be seen that a new and improved arrangement of boom and scoop for a mucking machine has been provided, which permits the scoop to be lowered for gathering a substantial distance below the rails along which the machine rides, and which is so arranged that movement of the machine along the track in a forward direction will cause the scoop to be positively moved into the material it is desired to load when in this lowered position, and that the arrangement of the scoop and boom with respect to the operating cables is such as to pivotally move the scoop and boom upwardly in a predetermined sequence which will permit the scoop to efficiently gather and load the material onto the conveyer 19 with a minimum amount of pillage.

While I have herein shown and described one form in which my invention may be embodied, it will be understood that the construction thereof and the arrngement of the various parts may be altered without departing from the spirit and scope thereof. Furthermore, I do not wish to be construed as limiting myself to the specific embodiment illustrated, excepting as it may be limited in the the appended claims.

I claim as my invention:

1. In a mucking machine adapted for operation in a tunnel shield, a main frame mounted on track wheels and axles, a conveyer extending along said frame, and an articulated boom pivotally mounted on the forward end of said frame and having a scoop pivotally mounted on the forward end thereof, said boom forming a chute for guiding material from said scoop to said conveyer and including a rear section pivoted to said main frame and having a forward end depending from the main body of said rear section, said boom also including a front section pivoted to said depending portion and having said scoop pivotally mounted thereon, rearwardly of the forward end thereof, and the forward end of said front section forming an abutment against which said scoop reacts during gathering.

2. In a mucking machine, a main frame mounted on track wheels and axles for movement along a track, a conveyer extending along said main frame, a scoop, a boom pivotally mounted on said frame adjacent the forward end of said conveyer for swinging movement in both horizontal and vertical planes, said main frame having a forwardly projecting portion adapted to form a support for the rearward end of said boom and said boom including a rear section having a portion depending from said support and a forward section transversely pivoted to said depending portion and adapted to extend below the level of the track, said scoop being pivotally mounted on said forward section, adjacent the forward end thereof, a stop on said first mentioned section of said boom adapted to engage said second mentioned section of said boom, and the forward end of said second mentioned section of said boom forming a stop for said scoop so that movement of said machine along the track will force said scoop into the material for loading.

3. In a mucking machine, a main frame mounted for movement along a track on track wheels and axles, a conveyer extending along said main frame, a boom pivotally mounted on said main frame adjacent the forward end of said conveyer for swinging movement in both horizontal and vertical planes, a scoop pivotally mounted on the end of said boom, said boom forming a chute for delivering material from said scoop to said conveyer, said boom including a rear section adapted to rest on a forwardly projecting portion of said frame, and a front section transversely pivoted thereto and adapted to extend below the level of the track, a stop on said first mentioned section of said boom for limiting downward movement of said forward section of said boom, and the forward end of said forward section of said boom forming a stop for said scoop so that movement of the machine along the track will feed the scoop into the material for loading.

4. In a mucking machine, a main frame mounted for movement along a track on track wheels and axles, a conveyer extending along said main frame, a boom pivotally mounted on said main frame adjacent the forward end of said conveyer for swinging movement in both horizontal and vertical planes, a scoop pivotally mounted on the end of said boom, said boom being articulated and forming a chute for the delivery of material from said scoop onto said conveyer and including a rear section adapted to rest on forwardly projecting portion of said frame, and a front section transversely pivoted to said rear portion at a point disposed beneath the level of said projecting portion on said frame, a stop on said rear section for limiting downward movement of said forward section of said boom, a stop on said front section for limiting downward pivotal movement of said scoop, said stops forming abutments for said boom and scoop so movement of the machine along the track will force said scoop into the material to be gathered.

5. In a mucking machine, a main frame mounted for movement along a track on track wheels and axles, a conveyer extending along said main frame, a boom pivotally mounted on said main frame adjacent the forward end of said conveyer for swinging movement in both horizontal and vertical planes, a scoop pivotally mounted on the end of said boom, said boom being articulated and forming a chute for the delivery of material from said scoop to said conveyer and including a rear section adapted to rest on a forwardly projecting portion of said frame, and a front section transversely pivoted to said rear section at a point disposed beneath the level of said projecting portion of said frame, a stop on said rear section for limiting downward movement of said forward section of said boom, and the forward end of said front section being adapted to engage said scoop and form a stop therefor so that said first mentioned stop and the forward end of said boom may form abutments for said boom and scoop, and movement of the machine along the track will cause said scoop to be forced into the material to be gathered.

6. In a mucking machine, a track mounted main frame, a conveyer extending along said main frame, an articulated boom pivotally mounted on said main frame for swinging movement in both horizontal and vertical planes, a scoop on the end of said boom, said boom forming a chute for delivering material from said scoop to said conveyer and being adapted to position said scoop for gathering from a point below the level of the track on which the machine is mounted, mechanism for swinging said scoop and boom vertically and from side to side including a pair of flexible cables having connection with opposite sides of said scoop and trained from a position disposed above the pivotal axis of said boom, and the angle of said flexible cables with respect to a line intersecting the axis of pivotal connection of said boom to said frame and the point over which said cables are trained being relatively wide so that pulling movement of said cables will first pivot said scoop in an upward direction from a lowermost gathering position to a relatively horizontal material carrying position, and pivot the forward portion of said boom upwardly about its axis of articulation to a predetermined position, and then pivot said entire boom in an upward direction to a discharge position.

7. In a mucking machine, a track mounted main frame, a conveyer extending along said main frame, an articulated boom pivotally mounted on said main frame for swinging movement in both horizontal and vertical planes, a scoop on the end of said boom, said boom forming a chute for delivering material from said scoop to said conveyer and being adapted to position said scoop for gathering movement from a point below the level of the track on which the machine is mounted, a stop for limiting downward pivotal movement of said boom, a stop for limiting pivotal movement of the forward end of said boom in a downward direction about its axis of articulation, another stop for limiting upward pivotal movement of said boom about its axis of articulation, a stop for limiting downward pivotal movement of said scoop, mechanism for swinging said scoop and boom vertically and from side to side including a pair of flexible cables having connection with opposite sides of said scoop and trained from a position disposed above the axis of pivotal connection of said boom to said main frame, and the angle of said flexible cables with respect to a line intersecting the axis of pivotal connection of said boom to said main frame and a point over which said cables are trained, when said scoop and boom are in a lowermost extended position, being relatively wide so that pulling movement of said cables will first pivot said scoop in an upward direction from a lowermost gathering position to a relatively horizontal material carrying position and then pivot the forward portion of said boom upwardly about its axis of articulation until it engages said stop for limiting upward pivotal movement thereof, and finally pivot said entire boom and scoop in an upward direction to a discharge position.

8. In a mucking machine adapted for operation in a tunnel shield, a main frame mounted on track wheels and axles, a conveyer extending along said frame, an articulated boom pivotally mounted on the forward end of said frame and having a scoop pivotally mounted on the forward end thereof, said boom forming a chute for guiding material from said scoop to said conveyer and including a rear section pivoted to said main frame and having a forward end depending from the main body of said rear portion, said boom also having a front section pivoted to said depending portion which forms a pivotal support for said scoop at a point disposed rearwardly of the forward end thereof, and the forward end of said front section forming an abutment against which said scoop reacts during gathering, and mechanism for swinging said scoop and boom vertically and from side to side including a pair of flexible cables having connection with opposite sides of said scoop and trained from a position disposed above the pivotal axis of said boom, the form and relation of said boom with respect to said cables being such that the angle of said cables with respect to a line intersecting the axis of pivotal connection of said boom to said main frame is relatively wide so that pulling movement of said cables will elevate said scoop and boom from a gathering to discharge position in a predetermined sequence.

9. In a mucking machine, a main frame mounted for movement along a track on track wheels and axles, a conveyer extending along said main frame, a boom pivotally mounted on said main frame adjacent the forward end of said conveyer for swinging movement in both horizontal and vertical planes, a scoop pivotally mounted on the end of said boom, said boom forming a chute for delivering material from said scoop to said conveyer, mechanism for swinging said scoop and boom vertically and from side to side including a pair of flexible cables having connection with opposite sides of said scoop and trained from a position disposed above the pivotal axis of said boom, said boom including a rear section adapted to rest on a forwardly projecting portion of said frame, and a front section transversely pivoted thereto at a point disposed beneath said forwardly projecting portion, a stop on said front section for limiting downward pivotal movement of said boom, and the forward end of said front section of said boom being adapted to engage said scoop whereby said stop and the forward end of said boom may form abutments for said boom and scoop so movement of the machine along the track in a forward direction will force said scoop into the material to be gathered, another stop on the forward end of the rear section of said boom for limiting independent upward swinging movement of the forward section of said boom, and the angle of said flexible cables with respect to the axis of pivotal connection of said scoop to said boom and the axis of pivotal connection of said boom to said main frame, being such that movement thereof will first pivot said scoop in an upward direction from a lowermost gathering position to a relatively horizontal material carrying position, then pivot said forward section of said boom upwardly until it engages said stop, and then pivot said entire boom to a discharge position onto said conveyer.

10. In a mucking machine, a track mounted main frame, a boom pivotally mounted on said main frame, a scoop mounted on the free end of said boom, means for elevating and swinging said scoop and boom from side to side, a support projecting forwardly from said main frame and adapted to limit downward movement of said boom and form a support therefor during the gathering operation, and resilient shock absorbing means interposed between said support and the underside of said boom, to cushion said boom as it engages said support, including a resiliently mounted engaging member.

11. In a mucking machine, a main frame mounted for movement along a track on track wheels and axles, a conveyer extending along said main frame, a boom pivotally mounted on said main frame adjacent the forward end of said conveyer for swinging movement in both horizontal and vertical planes, a scoop pivotally mounted on the end of said boom, said boom forming a chute for delivering material from said scoop to said conveyer, mechanism for swinging said scoop and boom vertically and from side to side including a pair of flexible cables having connection with opposite sides of said scoop and trained from a position disposed above the pivotal axis of said boom, said main frame having a forwardly projecting portion adapted to be engaged by the underside of said boom and form a support therefor, and resilient shock absorbing means on the underside of said boom adapted to engage said forwardly projecting portion of said frame.

12. In a mucking machine, a main frame mounted for movement along a track on track wheels and axles, a conveyer extending along said main frame, a boom pivotally mounted on said main frame adjacent the forward end of said conveyer for swinging movement in both horizontal and vertical planes, a scoop pivotally mounted on the end of said boom, said boom forming a chute for delivering material from said scoop to said conveyer, mechanism for swinging said scoop and boom vertically and from side to side including a pair of flexible cables having connection with opposite sides of said scoop and trained from a position disposed above the pivotal axis of said boom, said main frame having a forwardly projecting portion adapted to be engaged by the underside of said boom and form a support therefor, and resilient shock absorbing means on the underside of said boom including a member mounted on the underside of said boom for movement with respect thereto and adapted to engage said forwardly projecting portion of said frame, and resilient means interposed between said member and the underside of said boom.

13. In a mucking machine, a main frame mounted for movement along a track on track wheels and axles, a conveyer extending along said main frame, a boom pivotally mounted on said main frame adjacent the forward end of said conveyer for swinging movement in both horizontal and vertical planes, a scoop pivotally mounted on the end of said boom, said boom forming a chute for delivering material from said scoop to said conveyer, mechanism for swinging said scoop and boom vertically and from side to side including a pair of flexible cables having connection with opposite sides of said scoop and trained from a position disposed above the pivotal axis of said boom, said main frame having a forwardly projecting portion adapted to be engaged by the underside of said boom and form a support therefor, and resilient shock absorbing means on the underside of said boom including a plurality of members mounted on the underside of said boom for movement with respect thereto and being adapted to engage said forwardly projecting portion of said frame, and springs interposed between each of said members and the underside of said boom.

ANTHONY R. BIEDESS.